US010883634B2

(12) United States Patent
Uemura et al.

(10) Patent No.: US 10,883,634 B2
(45) Date of Patent: Jan. 5, 2021

(54) METAL SEAL AND FLUID CONTROL APPARATUS

(71) Applicants: Kumamoto Prefecture, Kumamoto (JP); HORIBA STEC, Co., Ltd., Kyoto (JP)

(72) Inventors: Makoto Uemura, Kumamoto (JP); Hiroki Miyaji, Kyoto (JP); Keiichi Murakami, Kyoto (JP)

(73) Assignees: KUMAMOTO PREFECTURE, Kumamoto (JP); HORIBA STEC, CO., LTD., Kyoto (JP)

( * ) Notice: Subject to any disclaimer, the term of this patent is extended or adjusted under 35 U.S.C. 154(b) by 115 days.

(21) Appl. No.: 16/201,914

(22) Filed: Nov. 27, 2018

(65) Prior Publication Data

US 2019/0162339 A1 May 30, 2019

(30) Foreign Application Priority Data

Nov. 28, 2017 (JP) .................. 2017-228199

(51) Int. Cl.
*F16J 15/08* (2006.01)
*F16J 1/00* (2006.01)
*F16L 23/20* (2006.01)

(52) U.S. Cl.
CPC .............. *F16L 23/20* (2013.01); *F16J 1/00* (2013.01); *F16J 15/0881* (2013.01)

(58) Field of Classification Search
CPC .......... F16L 23/20; F16L 23/00; F16L 23/16; F16L 23/18; F16J 1/00; F16J 15/0881; F16J 15/00; F16J 15/08; F16J 15/46; F16J 15/48

USPC ......................................... 277/314
See application file for complete search history.

(56) References Cited

U.S. PATENT DOCUMENTS

| 7,083,171 B2 * | 8/2006 | Oida .................... F16J 15/0881 277/626 |
| 10,415,729 B2 * | 9/2019 | Stobbart ................. F16L 23/20 |
| 2001/0045709 A1 * | 11/2001 | Stobbart ............... F16J 15/025 277/602 |
| 2003/0107188 A1 * | 6/2003 | Spence ............... F16J 15/0887 277/644 |

(Continued)

FOREIGN PATENT DOCUMENTS

JP          4299581 B2     7/2009

*Primary Examiner* — Nathan Cumar
(74) *Attorney, Agent, or Firm* — Alleman Hall Creasman & Tuttle LLP (57) ABSTRACT

A metal seal can be crushed evenly without forming wrinkles and scratches due to sliding against first and second flat surfaces. The seal comprises a first/second end surface arranged to face the first/second flat surface, respectively. The first end surface comprises a first convex part having a curved or flat surface that contacts the first flat surface, and a first projection that is formed shifted in a radial direction from the first convex part and has a ridge line that contacts the first flat surface. Prior to deformation, when the second end surface contacts the second flat surface and the first flat surface is separated from the first end surface, a point where a vertical distance between the first convex part and the second flat surface is the greatest and the ridge line are located on the same surface that is parallel to the first flat surface.

9 Claims, 9 Drawing Sheets (56) References Cited

U.S. PATENT DOCUMENTS

2010/0181727 A1* 7/2010 Santi ................... F16L 15/003
277/314

* cited by examiner

CONVENTIONAL ART

FIG. 7

CONVENTIONAL ART

CONVENTIONAL ART

METAL SEAL AND FLUID CONTROL APPARATUS

FIELD OF THE ART

This invention relates to a metal seal that is held by two parallel flat surfaces with a pressing force.

BACKGROUND ART

For example, a fluid control apparatus such as a mass flow controller is provided with a ring-shaped metal seal between a block where an internal flow channel is formed and a valve or a flow rate sensor mounted to close an opening part of the internal flow channel of the block. The metal seal closes a gap between the block and the flange by being pushed in an axial direction by two parallel flat surfaces between the block and the flange so that it is possible to prevent leakage of a fluid from the internal flow channel to the outside.

Figure 7:
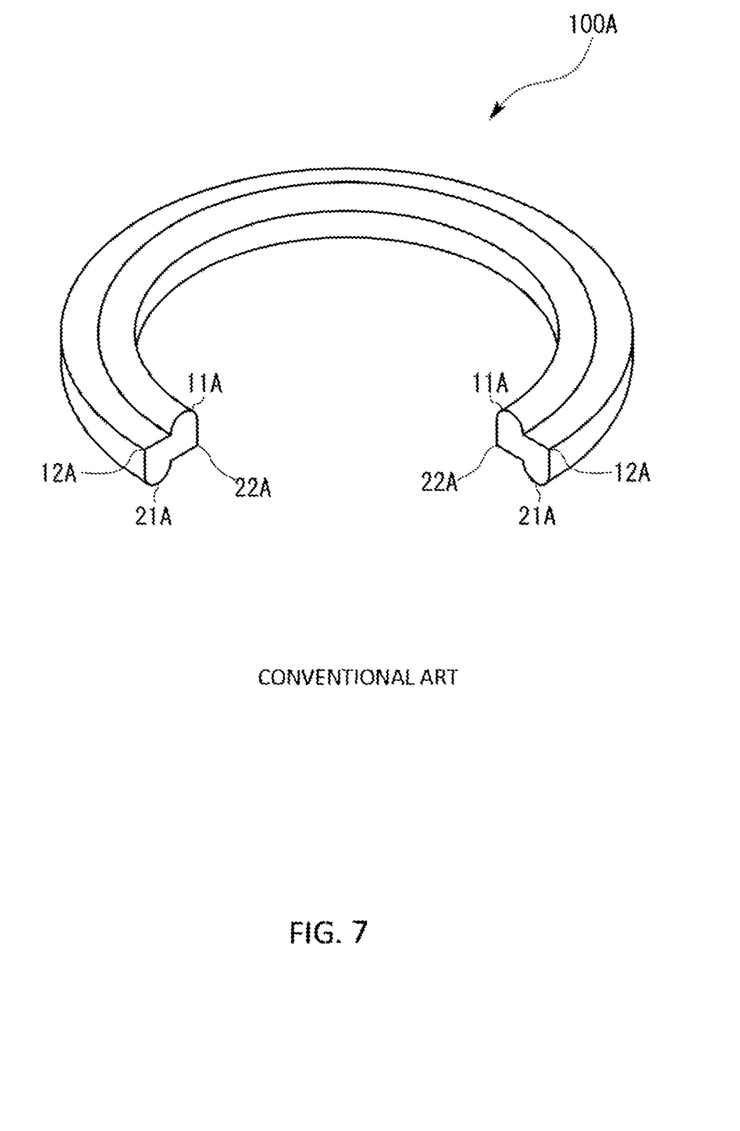
FIG. 7 is a schematic perspective view showing a conventional metal seal.
Figure 8:
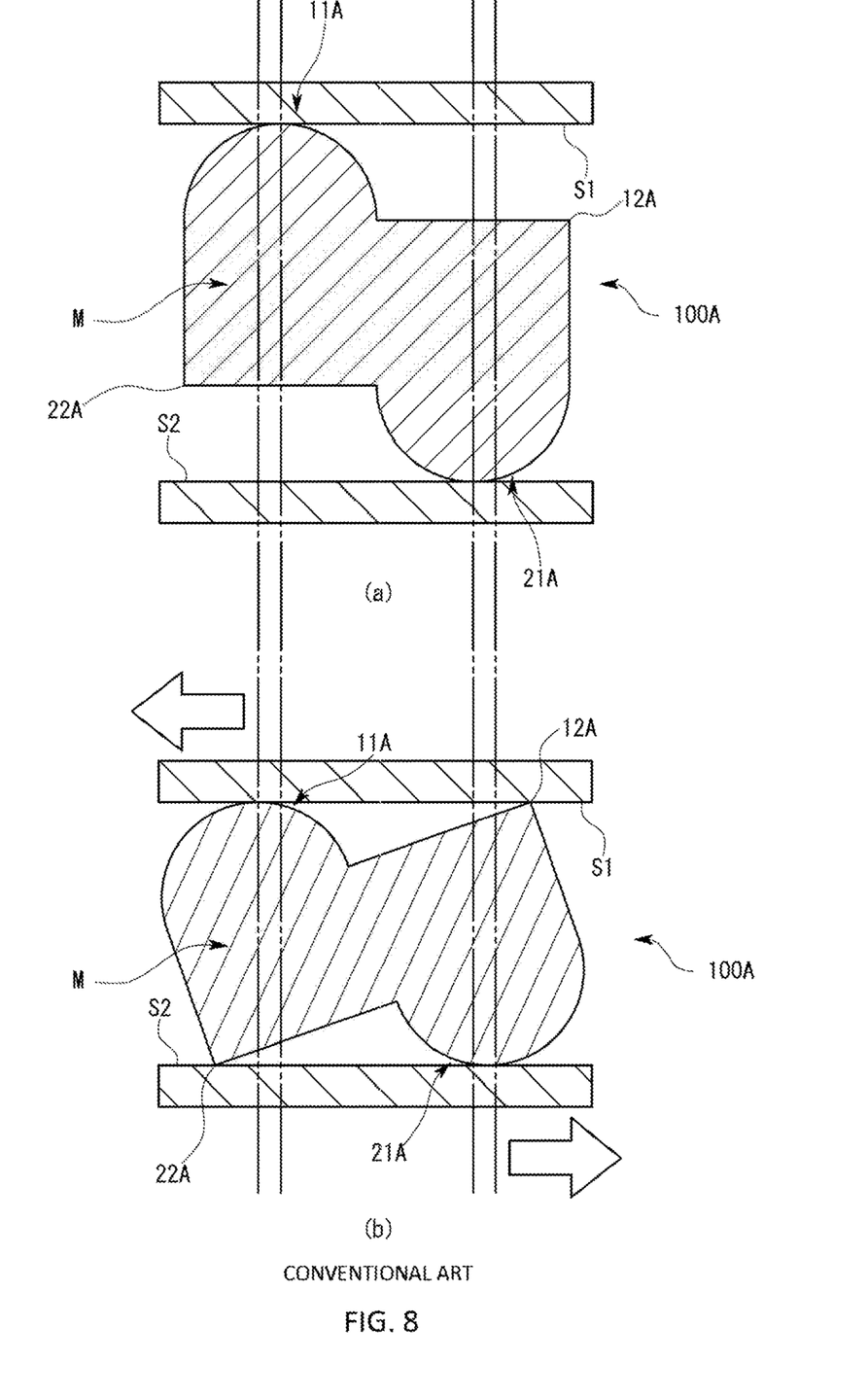
FIG. 8 is a schematic cross-sectional view showing a natural state of the conventional metal seal prior to deformation at the start of pressing force and a state after completion of holding the metal seal with a pressing force.

As a conventional ring-shaped metal seal 100A comprises, as shown in FIG. 7 and FIG. 8, an approximately rectangular middle base part (M) in a cross sectional view in a natural state prior to deformation of the metal seal 100A, a semicircular shaped first convex part 11A projecting from an upper part inner circumferential side of the middle base part (M), and a semicircular shaped second convex part 21A projecting from a bottom part inner circumferential side of the middle base part (M). A right-angled first edge 12A is formed on an outer circumferential side of the first convex part 11A and a right-angled second edge 22A is formed on an outer circumferential side of the second convex part 21A.

In the natural state prior to deformation of the metal seal 100A as shown in FIG. 8 at (a), only the first convex part 11A makes contact with the first flat surface (S1) and only the second convex part 21A makes contact with the second flat surface (S2). Next, when the first flat surface (S1) and the second flat surface (S2) that hold the metal seal 100A with pressing force approach each other as shown in FIG. 8 at (b), the first convex part 11A is pushed downward and the second convex part 21A is pushed upward. Then, elastic torsional deformation is inflicted on the metal seal 100A with the middle base part (M) (the center of gravity) as the center because the cross-section is twisted. As this result, the second edge 22A makes contact with the second flat surface (S2) at the same time when the first edge 12A makes contact with the first flat surface (S1).

According to the patent document 1, the elastic torsional deformation of the metal seal 100A is terminated by the use of the first edge 12A and the second edge 22A after inflicting the elastic torsional deformation for a predetermined period from a natural state. With this arrangement, it is so conceived that leakage of a fluid can be prevented by realizing an appropriate contact surface pressure in various positions so that no damage is generated on the first flat surface (S1) and the second flat surface (S2).

Actually, however, the fluid may leak even though the metal seal 100A having the above-mentioned arrangement is used. As a result of the keen examination on this cause, the present claimed inventors first found that there were the following several problems.

More specifically, if the first edge 12A and the second edge 22A are made to contact the first flat surface (S1) and the second flat surface (S2) by elastically deforming the metal seal 100A with torsion from a natural state, the metal seal 100A tends to stretch to an inner circumferential side and an outer circumferential side during deformation due to compression.

Since it is not possible for a volume of the metal seal 100A itself to change largely during deformation, the first convex part 11A slides against the first flat surface (S1) to the inner circumferential side and the second convex part 21A slides against the second flat surface (S2) to the outer circumferential side. As a result of this, since fine scratches are formed on the first flat surface (S1) and the second flat surface (S2) due to the sliding movement of the metal seal 100A, some portions that are not sealed might be created.

Figure 9:
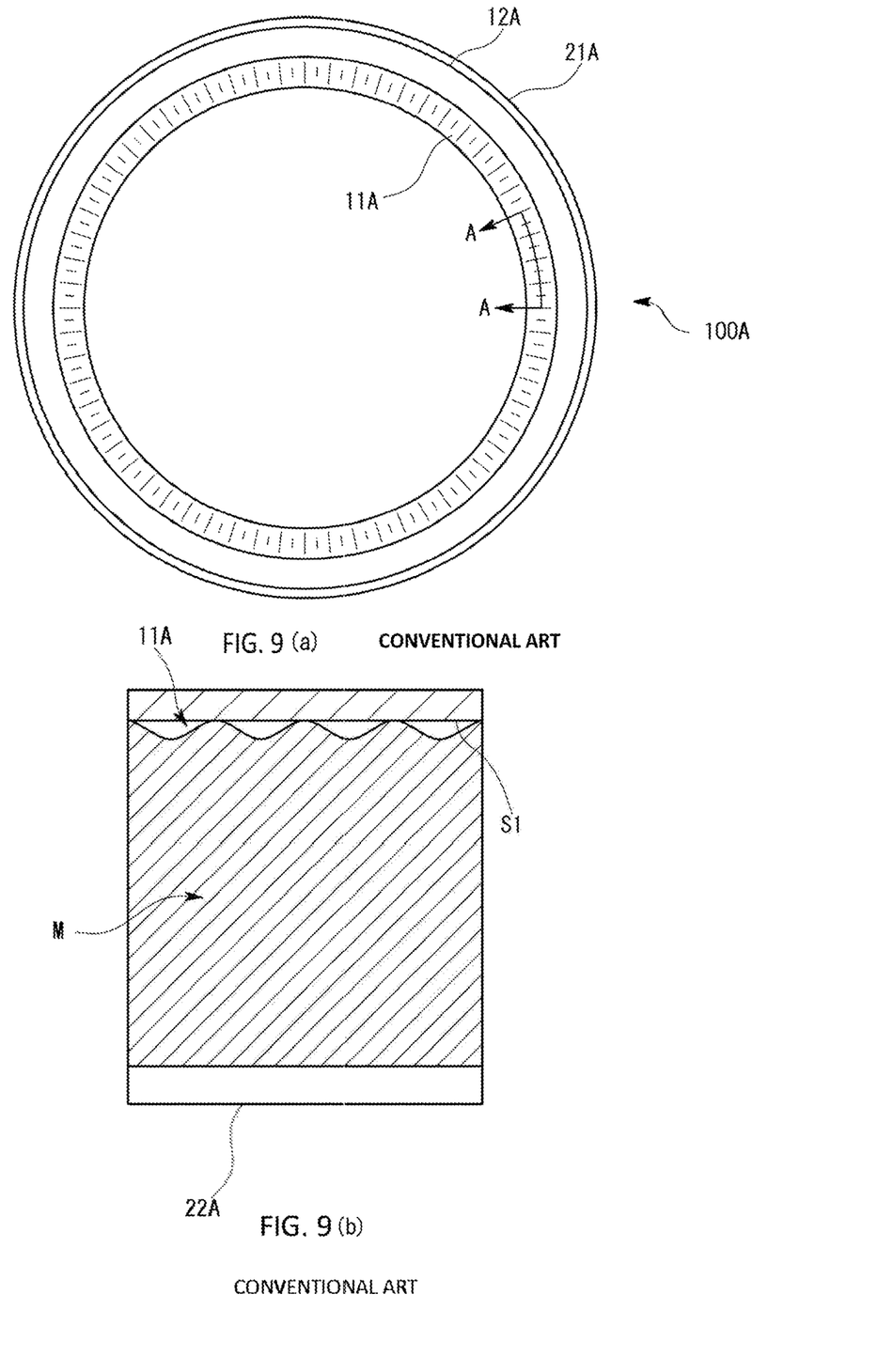
FIGS. 9(a) and 9(b) are schematic views showing a wrinkle occurring state after completion of holding the conventional metal seal with pressing force.

In addition, if elastically torsional deformation is caused for the metal seal 100A to a degree described in the patent document 1, as shown in FIG. 9 (a), the metal seal 100A is deformed to centralize the metal in the internal circumferential side so that minute wrinkles are created on the first convex part 11A along a circumference of the circular metal seal 100A. As a result of this, as shown in FIG. 9 (B) as being a cross-sectional view taken along a line A-A of FIG. 9 (a), the first convex part 11A does not make an abutting contact with the first surface (S1) in some portion so that the first convex part 11A makes contact with the first flat surface (S1) unevenly. Consequently, it is impossible for the metal seal 100A to attain a prospected compressed state.

PRIOR ART DOCUMENTS

Patent Documents

Patent document 1: Japanese Examined Patent Application Publication No. 4299581

DISCLOSURE OF THE INVENTION

Problems to be Solved by the Invention

The present claimed invention intends to solve all of the problems and an object of this invention is to provide a metal seal that can be crashed evenly without forming wrinkles and minute scratches due to a sliding movement of the metal seal against the first flat surface and the second flat surface.

Means to Solve the Problems

More specifically, a metal seal in accordance with this invention is a ring-shaped metal seal arranged between a first flat surface and a second flat surface that is parallel to the first flat surface and held by the first flat surface and the second flat surface with pressing force by making the first flat surface and the second flat surface approach each other, and is characterized by comprising a first end surface part arranged to face the first flat surface, and a second end surface part arranged to face the second flat surface, and the first end surface part comprises a first convex part having a curved surface or a flat surface that makes contact with the first flat surface, and a first projection that is formed with being shifted in a radial direction with respect to the first convex part and that has a ridge line that makes contact with the first flat surface, and in case that the metal seal is in a natural state prior to deformation wherein the second end surface part makes contact with the second flat surface and the first flat surface is separated from the first end surface part, a point where a vertical distance between the first convex part and the second flat surface is at a maximum and the ridge line of the first projection are located on a same plane that is parallel to the first flat surface.

In accordance with this arrangement, it is possible to initiate a movement of making the first convex part and the first projection contact with the first flat surface almost simultaneously by making the first flat surface and the second flat surface approach each other. As a result of this, it is possible to make it difficult to form large elastic torsional deformation on the metal seal during a process of holding the metal seal with pressing force so that wrinkles can be prevented due to deformation on the first convex part. Accordingly, whole of the metal seal is pressed evenly by the first flat surface and the second flat surface so that it is possible to realize high sealing effect.

In addition, since the first projection makes contact with the first flat surface from a time when a movement of pressing the metal seal by the first flat surface and the second flat surface starts, the ridge line of the first projection bites into the first flat surface so that it is possible to prevent the second end surface part from sliding against the second flat surface. Accordingly, a minute scratch is hardly made on the first flat surface and the second flat surface due to a slippery movement of the metal seal during a process of holding the metal seal with pressing force so that a subtle gap which might be a cause of liquid leakage is difficult to be generated.

In order to make it possible to realize the high sealing effect on the second end surface part and to realize a uniform holding state with pressing force by preventing wrinkles due to deformation of the metal seal, it is preferable that the second end surface part comprises a second convex part having a curved surface or a flat surface that makes contact with the second flat surface, and a second projection that is formed with being shifted in the radial direction with respect to the second convex part and that has a ridge line that makes contact with the second flat surface, and in case that the metal seal is in the natural state prior to deformation wherein the first end surface part makes contact with the first flat surface and the second flat surface is separated from the second end surface part, a point where a vertical distance between the second convex part and the first flat surface is at a maximum and the ridge line of the second projection are located on a same plane that is parallel to the second flat surface.

In order to make it easy for the metal seal to keep the uniform pressing state on the inner circumferential side and the outer circumferential side, it is preferable that the first convex part is formed in an inner circumferential side than the second convex part, and the first projection is formed in an outer circumferential side than the second projection.

In order to further prevent the sliding movement of the first convex part and the second convex part due to the metal seal held with pressing force between the first flat surface and the second flat surface, it is preferable that the first convex part and the second projection are formed to be lined up in an axial direction, and the second convex part and the first projection are formed to be lined up in the axial direction.

In order to facilitate machining the metal seal, it is preferable that in case of viewing a cross-section of the metal seal, the first end surface part and the second end surface part are rotationally symmetric with respect to a predetermined rotation center.

In order to make either the first end surface part or the second end surface part easy to deform first so as not to generate difference of a deformation mode between individual metal seals at a time when a movement of holding the metal seal with pressing force by the first flat surface and the second flat surface starts, it is preferable that the first end surface part and the second end surface part are asymmetric in case of viewing a cross-section of the metal seal. In case that a shape of the cross-section is symmetric, the timing when deformation starts changes for the first end surface part and the second end surface part depending on variation in a quality of the metal constituting the metal seal. In case that the shape of the cross-section is asymmetric, an influence on the difference of the strength as a structure is made to be bigger than that on the quality of the metal so that it is easier to limit the deformation mode wherein the deformation starts from either one of the first end surface part and the second end surface part without fail. Accordingly, it is possible to prevent variation of the sealing effect between individuals of the metal seal.

In accordance with a fluid control apparatus that comprises the metal seal in accordance with this invention, a flange where a first flat surface is formed, and a block where a second flat surface is formed, and the metal seal is held with pressing force between the first flat surface and the second flat surface by mounting the flange on the block, it is possible to reduce leakage of a fluid from a connecting position where each fluid equipment is mounted on the block so that more accurate fluid control can be realized.

In addition, the metal seal in accordance with this invention is a metal seal that is a ring-shaped metal seal comprising a first end surface part and a second end surface part, and the first end surface part comprises a first convex part having a curved surface or a flat surface, and a first projection that is formed with being shifted in a radial direction of the metal seal with respect to the first convex part and that has a ridge line, in case that the second end surface part is arranged on a predetermined surface and the metal seal is in a natural state prior or deformation, a point where a vertical distance between the first convex part and the predetermined surface is at a maximum and the ridge line of the first projection are located on a same plane that is parallel to the predetermined surface.

In accordance with this arrangement, in case of producing a sealing effect by holding the metal seal with pressing force between parallel flat surfaces of the first end surface part and the second end surface part, it is possible to start a movement of making the first convex part contact with the first end surface part at the same time when the first projection makes contact with the first end surface. Accordingly, almost no elastic torsional deformation is generated on the metal seal itself so that it is possible to prevent wrinkles formed on the first convex part due to deformation of the metal seal and to realize high sealing effect because the first convex part is pushed uniformly. In addition, since the first projection makes contact with the surface from which the first projection is pushed from the beginning, it is possible to prevent the metal seal from sliding in the radial direction due to holding with pressing force and to prevent a minute scratch as being a cause of leakage of a fluid.

In order to prevent wrinkles from generating during a process of holding the metal seal with pressing force between flat surfaces so that a uniform sealing effect can be realized and to prevent the metal seal from sliding against the flat surfaces so that a minute scratch as being a cause of leakage can be prevented, it is preferable to use a sealing method using a ring-shaped metal seal comprising a first concave part having a curved surface or a flat surface, a first end surface part comprising a first projection having a ridge line, and a second end surface part, and this method arranges the first end surface part separately to face the first flat surface and makes the second end surface contact the second flat surface in a natural state of the metal seal prior to deformation, and makes the first flat surface contact the first convex part and the ridge line of the first projection simultaneously in case that the first flat surface and the second surface are made to approach each other.

Effect of the Invention

In accordance with the metal seal of this invention, since both the first convex part and the first projection make contact with the first flat surface simultaneously without elastic deformation in the natural state prior to deformation of the metal seal, the metal seal does not deform largely during a process of being held with pressing force. Accordingly, it is possible to realize a uniform sealing effect on the first convex part by preventing wrinkles on the first convex part.

In addition, since the first projection serves as a stopper by making contact with the first flat surface from a time when deformation of the metal seal starts, it is possible to prevent the second end surface part from sliding against the second flat surface so that a minute scratch in the radial direction can be prevented from generating on the second flat surface.

According to these results, it is possible to preferably improve the sealing effect of the metal seal compared with a conventional metal seal and to prevent leakage of the fluid.

BEST MODES OF EMBODYING THE INVENTION

A metal seal 100 in accordance with a first embodiment of this invention will be explained with reference to drawings.

Figure 1:
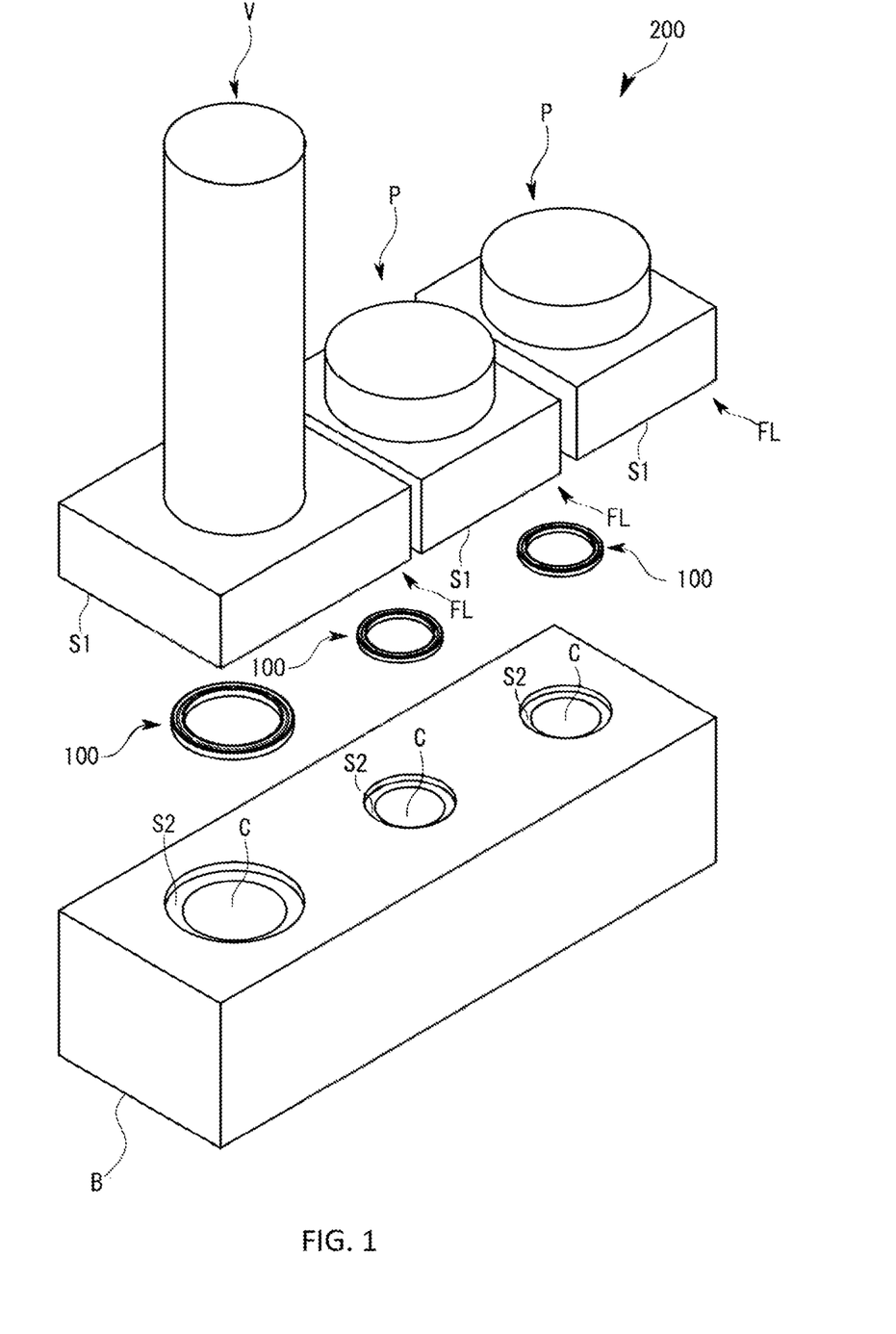
FIG. 1 is a schematic exploded perspective view showing a metal seal and a mass flow controller by which the metal seal is used in accordance with a first embodiment of this invention.

As shown in FIG. 1, the metal seal 100 of the first embodiment is used for preventing leakage of a fluid through a part connecting devices constituting a mass flow controller 200 as being a fluid control apparatus. The mass flow controller 200 comprises a block (B) where an internal flow channel is formed, a valve (V) mounted on the block (B) and two pressure sensors (P).

The block (B) has almost a rectangular parallelepiped shape and an upper surface of the rectangular parallelepiped shape is a surface for mounting the valve (V) and the pressure sensors (P). A plurality of external opening parts of the internal flow channel are arranged on the mounting surface of the block (B) and a ring-shaped metal seal 10 is arranged on a circumference of each of the opening parts. More concretely, a first flat surface (S1) is arranged on a bottom surface of a flange (FL) for mounting the valve (V) on the block (B) and on a bottom surface of a flange (FL) for mounting the pressure sensor (P) on the block (B) respectively. In addition, a ring-shaped second flat surface (S2) formed on a circumference of an opening part (C) of the internal flow channel is formed on the mounting surface of the block (B). For convenience of explanation, an upper surface side is defined as the first flat surface (S1) and a lower surface side is defined as the second flat surface (S2) in FIG. 1, however, this relationship may be reversed.

The metal seal 100 is held by the first flat surface (S1) and the second flat surface (S2) with pressing force by approaching the first flat surface (S1) and the second flat surface (S2) each other while the flange (FL) for mounting the valve (V) and the flange (FL) for mounting the pressure sensor (P) are fixed to the block (B) with a bolt.

Figure 2:
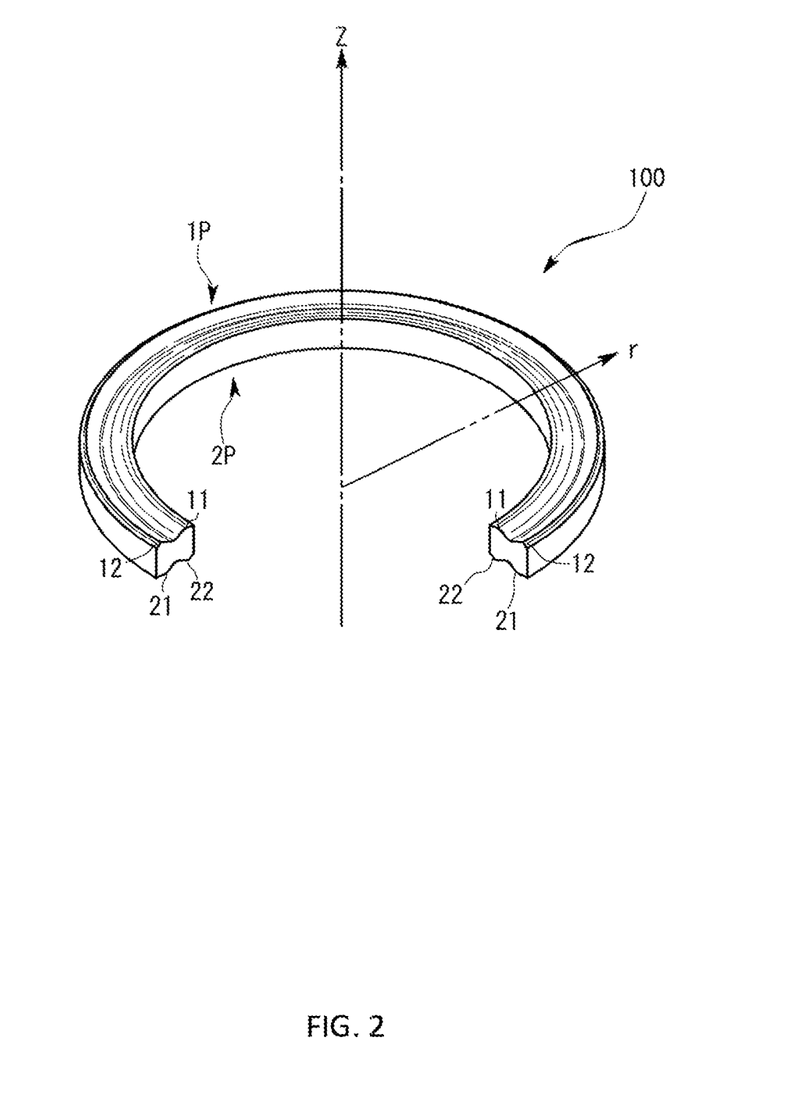
FIG. 2 is a schematic perspective view of the metal seal of the first embodiment.
Figure 3:
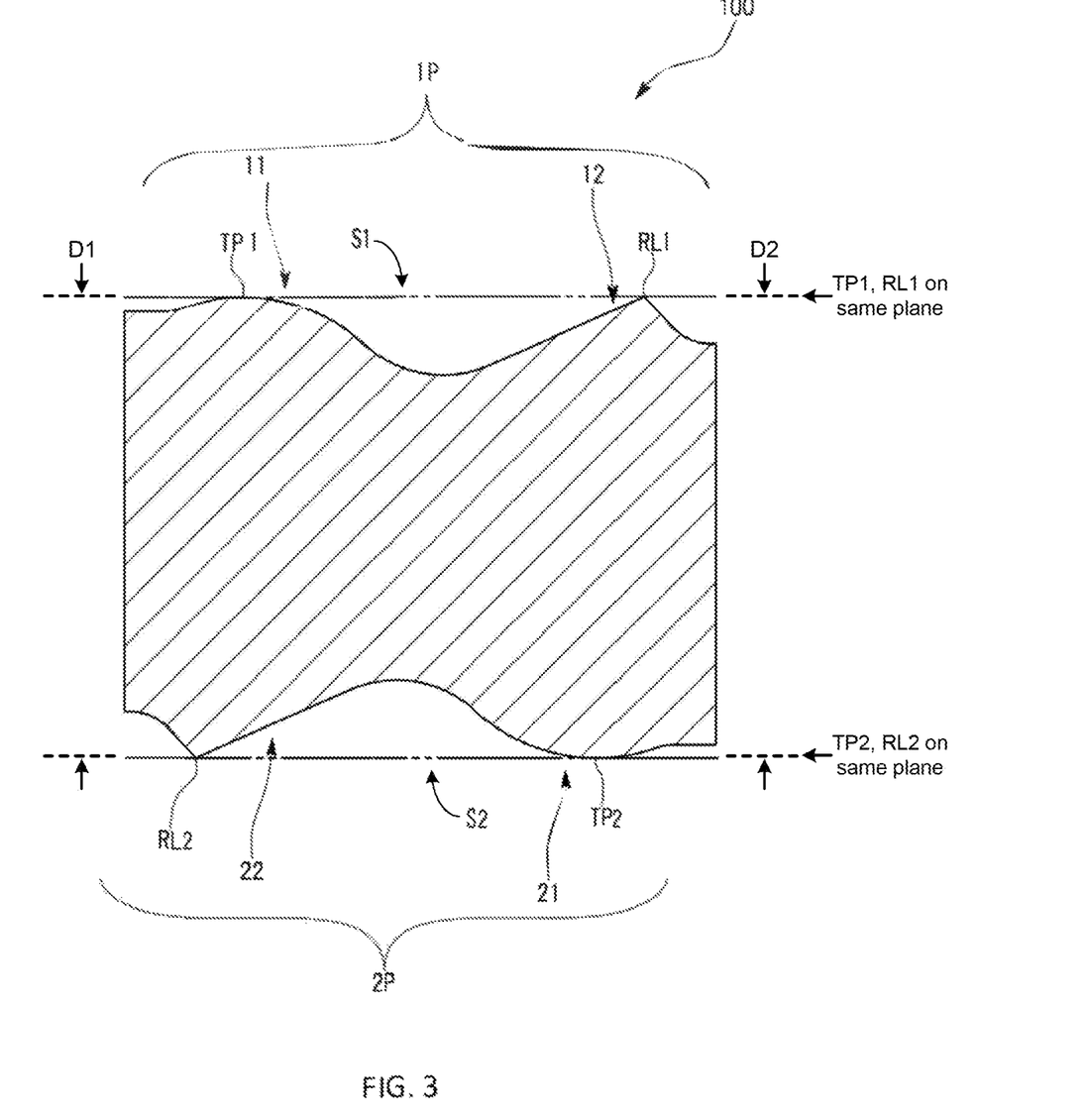
FIG. 3 is a schematic cross-sectional view showing a cross section of the metal seal of the first embodiment.

The metal seal 100 will be explained in detail. In case that the cylindrical coordination system is set as shown in FIG. 2, the metal seal 100 is in a shape of a rotation body rotated around a center axis (Z) once wherein a cross section shown in FIG. 3 is arranged at a position separated from the center axis (Z) by a predetermined distance in a radial direction (r). More concretely, the metal seal 100 comprises a first end surface part 1P facing the first flat surface (S1) and a second end surface part 2P facing the second flat surface (S2). As shown in FIG. 2 and FIG. 3, two projecting parts are formed on the first end surface part 1P and the second end surface part 2P respectively. In addition, in the first embodiment, a shape of a cross section of the metal seal 100 is so formed that a shape of the first end surface part 1P and a shape of the second end surface part 2P are rotationally symmetrical to a center of gravity. The shape of the first end surface part 1P and the shape of the second end surface part 2P are formed by a machine work such as a cutting work, however, it may be formed by other processing work. Also in the following explanation, the rotational axis passing a center in case of viewing the metal seal 100 from a direction perpendicular to the first end surface part 1P or the second end surface part 2P is set to be the center axis (Z), and a direction perpendicular to the center axis (Z) is se to be the radial direction (r).

As shown in the perspective view of FIG. 2 and the cross-sectional view of FIG. 3, the first end surface part 1P comprises a first convex part 11 formed in an inner circumferential side in the radial direction (r) and a first projecting part 12 formed in an outer circumferential side in the radial direction (r).

The first convex part 11 projects toward the first flat surface (S1) side wherein a cross-section thereof is a partial cylindrical shape as shown in FIG. 3. As a result of this, as shown in the perspective view of the FIG. 2, the first convex part 11 is arranged so as to be in a half pipe shape as a whole in the inner circumferential side of the first end surface part 1P.

The first projection 12 is, as shown in FIG. 3, a generally triangle in a cross-section. As a result of this, as shown in the perspective view of FIG. 2, the first projection 12 forms a ridge line (RL) making a circuit in the outer circumferential side of the first end surface part 1P. A dihedral angle of the first projection 12 is made to be a little larger than 90° as shown in the cross-sectional view in FIG. 3, and a slope face of the outer circumferential side is made larger than a slope face of the inner circumferential side.

As shown in the cross-sectional view of FIG. 3, the second end surface part 2P comprises a second projection 22 formed in the inner circumferential side in the radial direction (r) and a second convex part 21 formed in the outer circumferential side. Since the first end surface part 1P and the second end surface part 2P are formed rotationally symmetry to a center of gravity, the first convex part 11 has the same shape as that of the second convex part 21 and the first projection 12 has the same shape as that of the second projection 22.

Figure 4:
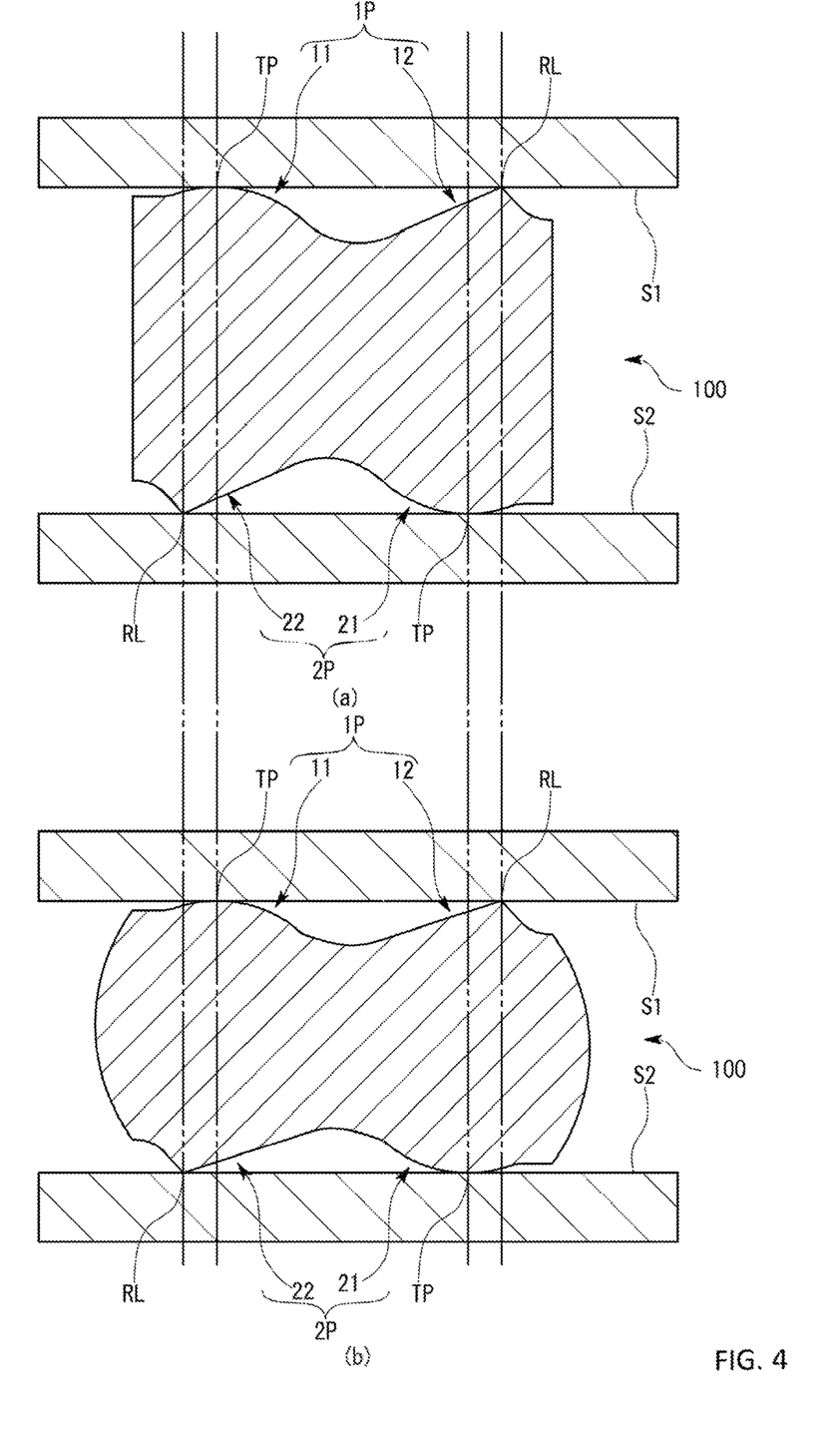
FIG. 4 is a schematic cross-sectional view showing a natural state of the metal seal prior to deformation at the start of pressing force and a state after completion of holding the metal seal with a pressing force.

As shown in the cross-sectional view of FIG. 3, the second projection 22 is arranged on the downside of the first convex part 11. In other words, the first convex part 11 and the second projection 22 are arranged in line with respect to the direction of the center axis (Z) of the metal seal 100. In a natural state of the metal seal 100 prior to deformation as shown in FIG. 4 at (a), a point of the first convex part 11 located at an outermost point along a direction of the center axis (Z), namely a contact point (TP1) where the first convex part 11 makes contact with the first flat surface (S1), is arranged at the outer circumferential side at a maximum distance D1 from the ridge line (RL2) of the second projection 22. In addition, a dihedral angle of the second projection 22 is made to be a little larger than 90° as shown in the cross-sectional view in FIG. 3, and a slope face of the inner circumferential side is made larger than a slope face of the outer circumferential side.

The second convex part 21 is arranged on the lower side of the first projection 12 as shown in the cross-sectional view of FIG. 3, and the first projection 12 and the second convex part 21 are arranged in line with respect to the direction of the center axis (Z) of the metal seal 100. In a natural state of the metal seal 100 prior to deformation as shown in FIG. 4 at (a), a point of the second convex part 21 located at an outermost point along a direction of the center axis (Z), namely a contact point (TP2) where the second convex part 21 makes contact with the second flat surface (S2), is arranged at the inner circumferential side at a maximum distance D2 from the ridge line (RL1) of the first projection 12.

As shown in FIG. 4 at (a), in a natural state prior to deformation and at a time when the holding process with pressing force is started wherein the first flat surface S1 makes contact with the first end surface part 1P and the second flat surface (S2) makes contact with the second end surface part (2P), the metal seal 100 is so arranged that the contact point (TP) (a contact line) of the first convex part 11 and the ridge line (RL) of the first projection 12 are arranged at the same height viewed from the second flat surface (S2). In other words, in case that the metal seal 100 is placed on the second flat surface (S2) in the natural state, the contact point (TP) as being a point of the first convex part 11 that is the farthest away in a perpendicular direction from the second flat surface (S2) and the ridge line (RL) of the first projection 12 are arranged on the same level that is parallel to the second flat surface (S2).

Similarly, in a natural state, the ridge line (RL) of the second projection 22 and the contact point (TP) where the second convex part 21 makes contact with the second flat surface (S2) are arranged on the same level that is parallel to the first flat surface (S1).

Furthermore, in other words, in case that a tomographic image of the metal seal 100 is taken along the direction of the center axis (Z), images of a contact line of the first convex part 11 on the first flat surface (S1) and the ridge line (RL) of the first projection 12 are taken on the same level. Similarly, images of the ridge line (RL) of the second projection 22 and the contact line of the second projection 21 on the second flat surface S2 are taken on the same level. In addition, in case that the second end surface part (2P) of the metal seal 100 is placed on a predetermined surface such as a surface plate, a point or a line of the first convex part 11 that is the farthest away in a perpendicular direction from the predetermined surface and the ridge line (RL) of the first projection 12 are placed on the same level that is parallel to the predetermined surface. In addition, since the metal seal 100 is a toroid having uniform sections, in case of viewing arbitrary two end surfaces that appear in one or two cutting surfaces including the center axis (Z) as shown in FIG. 2, the two contact points (TP) that are the most projecting position of the first convex part 11 that appears in each end surface and that make contact with the first flat surface (S1) and the two ridge lines (RL) of the first projection 12 that appear on each end surface are arranged on the same level in the natural state of the metal seal 100 prior to deformation.

A case wherein the metal seal 100 having this arrangement is held between the first flat surface (S1) and the second flat surface (S2) with pressing force will be explained with reference to FIG. 4.

As shown in FIG. 4 at (a), in the natural state prior to deformation and at a time when pressurizing is started wherein the first flat surface S1 makes contact with the first end surface part 1P and the second flat surface (S2) makes contact with the second end surface part 2P, the metal seal 100 is so arranged that the contact point (TP) of the first convex part 11 and the ridge line (RL) of the first projection 12 contact the first flat surface (S1) simultaneously. Similarly, the ridge line (RL) of the second projection 22 and the contact point (TP) of the second convex part 21 contact the second flat surface (S2) simultaneously.

Next, when the first flat surface (S1) further approaches the second flat surface (S2) from the state shown in FIG. 4 at (a), since the ridge line (RL) of the first projection 12 is in contact with the first flat surface (S1) at a time when pressurizing is started, the ridge line (RL) of the first projection 12 serves as a wedge so that the first projection 12 hardly moves from a position where the first projection 12 initially makes contact with the first flat surface (S1) even though the metal seal 100 deforms as shown in FIG. 4 at (b). As a result of this, the second convex part 21 hardly slides on the second flat surface (S2) and hardly moves from the initial contact position even though a shape of the second convex part 21 is a curved surface arranged to face the first projection 12 in the center axis (Z).

In addition, since the second projection 22 produces the same effect as that of the first projection 12, as is clear from a comparison between FIG. 4 at (a) and FIG. 4 at (b), the position where the first convex part 11 makes contact with the first flat surface (S1) and the position where the second projection 22 makes contact with the second flat surface (S2) hardly move from the initial position. As a result of this, the first convex part 11 hardly slides against the first flat surface (S1) and hardly moves from the initial contact position even though a shape of the first convex part 11 is a curved surface arranged to face the second projection 22 with respect to the direction of the center axis (Z).

For these reasons, in accordance with the metal seal 100 of the first embodiment, a minute scratch is hardly made on the first flat surface (S1) or the second flat surface (S2) due to a slippery movement of the metal seal 100 while proceeding with holding the metal seal 100 with pressing force so that a subtle gap which might be a cause of liquid leakage is difficult to be generated.

Furthermore, since holding the metal seal 100 with pressing force is stared from a state wherein the first convex part 11 and the first projection 12 make contact with the first flat surface (S1) and the second convex part 21 and the second projection 22 make contact with the second flat surface (S2) simultaneously, an amount of elastic torsional deformation generated for the metal seal 100 is small compared with a conventional metal seal. As a result of this, deformation of the metal seal 100 hardly causes wrinkles on the first convex part 11 or the second convex part 21.

Accordingly, the metal seal 100 of the first embodiment is evenly pushed by the first flat surface (S1) and the second flat surface (S2) so that a high adhesiveness can be realized along a whole circumference of the metal seal 100.

Due to the above-mentioned effects, it is possible for the metal seal 100 of the first embodiment to realize high sealing effect and to prevent leakage of a fluid. In addition, if the metal seal 100 is used for the first flat surface (S1) and the second flat surface (S2) in a reversed manner, it is possible to make the first projection 12 contact with the second flat surface (S2) and the second projection 22 contact with the first flat surface (S1) anew so that it is possible to enable sealing at least twice.

Figure 5:
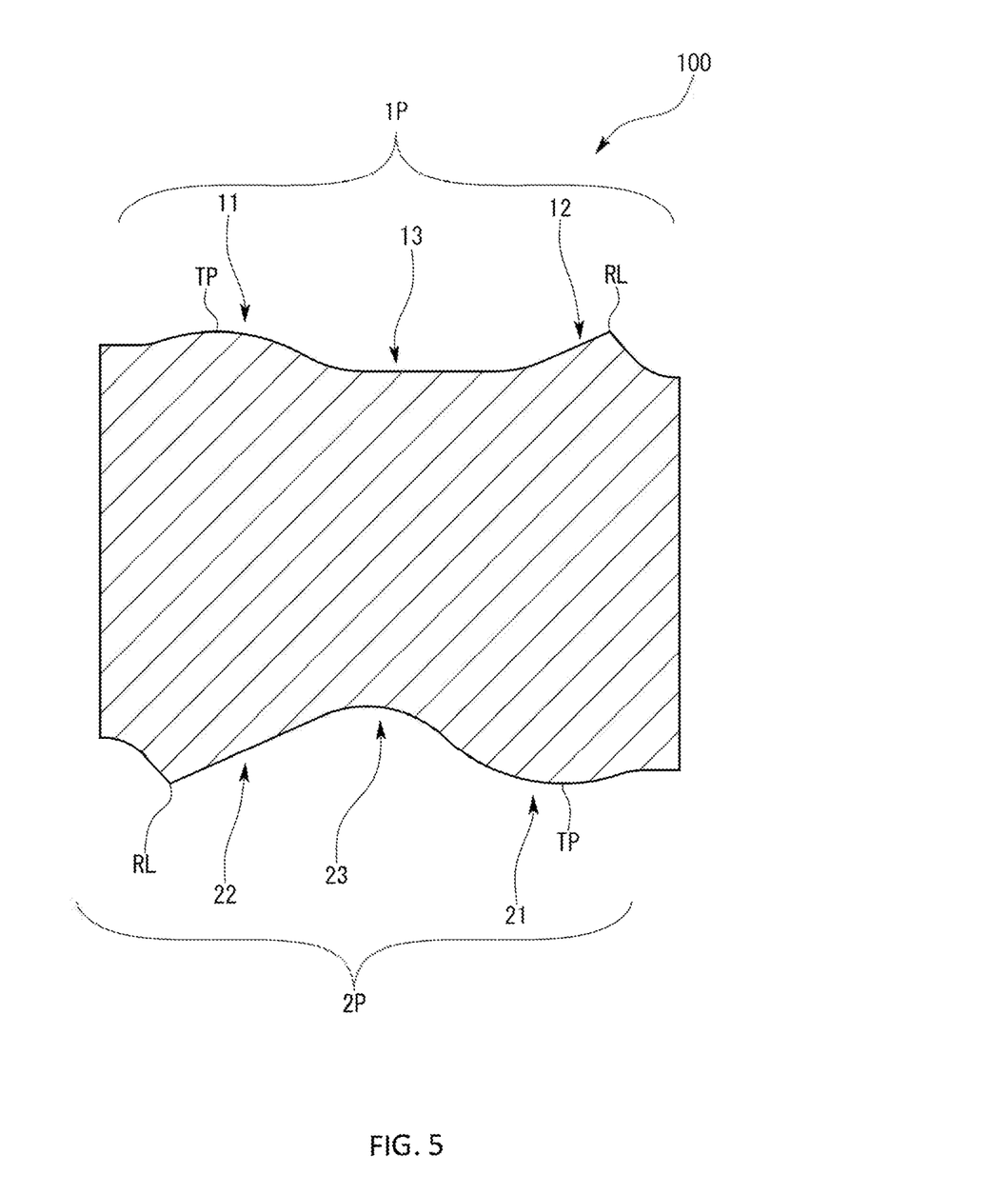
FIG. 5 is a schematic cross-sectional view showing a cross section of a metal seal in accordance with a second embodiment of this invention.

Next, a metal seal 100 in accordance with a second embodiment will be explained with reference to FIG. 5. The same parts as those in the second embodiment are denoted by the same reference numerals as those in the first embodiment.

The metal seal 100 of the second embodiment is formed so as to make its cross-section asymmetry. Concretely, in the second embodiment, a shape of the first concave part 13 formed between the first convex part 11 and the first projection 12 is made different from a shape of the second concave part 23 formed between the second projection 22 and the second convex part 21. More specifically, a thickness of the first concave part 13 is made thicker than a thickness of the second concave part 23 so that a first end surface part (1P) side hardly deforms more than a second end surface part (2P) side.

In accordance with this arrangement, if the metal seal 100 of the second embodiment is held with pressing force between the first flat surface (S1) and the second flat surface (S2), the structure makes it easy to realize a deformation mode wherein the second end surface part (2P) first starts deformation and then the first end surface part (1P) side is deformed. Accordingly, even though there is some dispersion in quality of metal as a material of a plurality of metal seals 100, it is possible to get rid of individual differences and to realize the same deformation mode for every metal seal 100. As a result of this, in accordance with the metal seal 100 of the second embodiment, it is possible to lessen an influence on dispersion of the quality of the material in spite of mass production so that a characteristic of the sealing can be kept constant.

Figure 6:
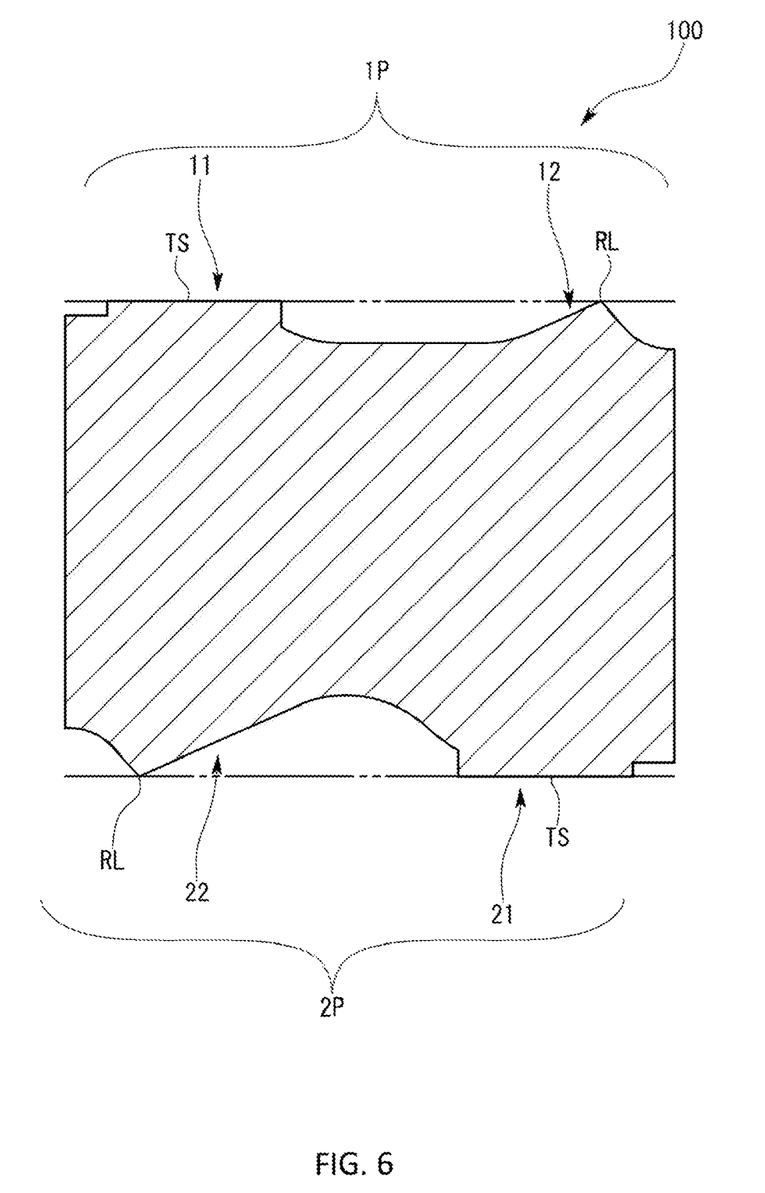
FIG. 6 is a schematic cross-sectional view showing a cross section of a metal seal in accordance with a third embodiment of this invention.

Next, a metal seal 100 of a third embodiment will be explained with reference to FIG. 6. The same parts as those in the third embodiment are denoted by the same reference numerals as those in the first embodiment.

The metal seal 100 of the third embodiment differs from that of the first embodiment in that the shape of the first convex part 11 and the second convex part 21 is not curved but flat. Concretely, the first convex part 11 has a contact surface (TS) that makes contact with the first flat surface (S1) at the same time when the ridge line (RL) of the first projection 12 makes contact with the first flat surface (S1) at a time when the metal seal 100 is started to be held with pressing force between the first flat surface (S1) and the second flat surface (S2). Similarly the second convex part 21 also has a contact surface (TS) that makes contact with the second flat surface (S2) at the same time when the ridge line (RL) of the second projection 22 makes contact with the second flat surface (S2).

The metal seal 100 of the third embodiment also produces almost the same sealing effect as that of the first embodiment, and a minute scratch is difficult to be inflicted on the first flat surface (S1) or the second flat surface (S2), thereby preventing leakage of the fluid.

Other embodiment will be explained.

The usage of the metal seal in accordance with this invention is not limited to a mass flow controller and may be other. For example, the metal seal may be used for a fluid control apparatus such as a pressure control apparatus or a joint of pipes where a fluid flows.

The layout of the first convex part, the first projection, the second convex part and the second projection in the radial direction is not limited to the above-mentioned each embodiment. For example, the first convex part and the second convex part may be arranged to be lined up in the center axis direction of the metal seal and the first projection and the second projection may be arranged to be lined up in the center axis direction of the metal seal.

The shape of the first projection and the second projection may be any as far as a ridge line is formed. For example, the ridge line of first projection and the ridge line of the second projection may be partly cut as far as the sealing performance is secured in whole circumference of the first convex part and the second convex part. In other words, the first projection, the second projection may serve only as an anchor to the first flat surface and the second flat surface during a process of holding the metal seal with pressing force.

The shape of the first convex part and the second convex part may be asymmetry, and the shape of the first projection and the second projection may be asymmetry.

The shape of the metal seal may be any as far as it is ring-shaped, and is not limited to a general perfect circle viewed from a direction perpendicular to the first end surface part or the second end surface part similar to the above-mentioned embodiments. The shape of the metal seal may be circular such as an oval, a square having round corners, or a track shape viewed from a direction perpendicular to the first end surface part or the second end surface part. In case of other than a shape of a perfect circle, the center axis in the above-mentioned embodiment can be defined as a reference axis. In addition, it is preferable that the metal seal is formed as a ring form having uniform sections wherein every section of a cross section with respect to a drawing direction is the same.

In addition, the present claimed invention may be variously combined or modified without departing from a spirit of the invention.

EXPLANATION OF CODES

100 . . . metal seal
1P . . . first end surface part
11 . . . first convex part
12 . . . first projection
2P . . . second end surface part
21 . . . second convex part
22 . . . second projection
TP . . . contact point
RL . . . ridge line

The invention claimed is:

1. A metal seal that is a ring-shaped metal seal arranged between a first flat surface and a second flat surface that is parallel to the first flat surface and held by the first flat surface and the second flat surface with a pressing force as the first flat surface and the second flat surface approach each other, the metal seal comprising:
a first end surface part arranged to face the first flat surface; and
a second end surface part arranged to face the second flat surface, wherein
the first end surface part comprises:
a first convex part having a curved surface or a flat surface that makes contact with the first flat surface; and
a first projection that is formed by being shifted in a radial direction with respect to the first convex part and that has a ridge line that makes contact with the first flat surface, and
when the metal seal is in a natural state prior to deformation in which the second end surface part makes contact with the second flat surface and the first flat surface is separated from the first end surface part, a point where a vertical distance between the first convex part and the second flat surface is at a maximum and the ridge line of the first projection are located on a same plane that is parallel to the first flat surface.

2. The metal seal described in claim 1, wherein the second end surface part comprises:
a second convex part having a curved surface or a flat surface that makes contact with the second flat surface; and
a second projection that is formed with being shifted in the radial direction with respect to the second convex part and that has a ridge line that makes contact with the second flat surface, and
when the metal seal is in the natural state prior to deformation in which the first end surface part makes contact with the first flat surface and the second flat surface is separated from the second end surface part, a point where a vertical distance between the second convex part and the first flat surface is at a maximum and the ridge line of the second projection are located on a same plane that is parallel to the second flat surface.

3. The metal seal described in claim 2, wherein
the first convex part is formed at an inner circumferential side,
the second convex part is formed at an outer circumferential side,
the first projection is formed at the outer circumferential side, and
the second projection is formed at the inner circumferential side.

4. The metal seal described in claim 2, wherein
the first convex part and the second projection are formed to be aligned in an axial direction, and
the second convex part and the first projection are formed to be aligned in the axial direction.

5. The metal seal described in claim 1, wherein
the first end surface part and the second end surface part are rotationally symmetric with respect to a predetermined rotation center.

6. The metal seal described in claim 1, wherein
the first end surface part and the second end surface part are asymmetric.

7. A fluid control apparatus comprising:
the metal seal described in claim 1;
a flange on which the first flat surface is formed; and
a block on which the second flat surface is formed, wherein
the metal seal is held with a pressing force between the first flat surface and the second flat surface by mounting the flange on the block.

8. A metal seal that is a ring-shaped metal seal comprising a first end surface part and a second end surface part, wherein
the first end surface part comprises:
a first convex part having a curved surface or a flat surface; and
a first projection that is formed being shifted in a radial direction of the metal seal with respect to the first convex part and that has a ridge line,
when the second end surface part is arranged on a predetermined surface and the metal seal is in a natural state prior to deformation, a point where a vertical distance between the first convex part and the predetermined surface is at a maximum and the ridge line of the first projection are located on a same plane that is parallel to the predetermined surface.

9. A sealing method using the ring-shaped metal seal of claim 1 comprising the first end surface part comprising a first concave part having a curved surface or a flat surface and the first projection having the ridge line, and the second end surface part, the sealing method comprising:
arranging the ring-shaped metal seal between the first flat surface and the second flat surface such that the first end surface part faces the first flat surface,
configuring the second end surface part to contact the second flat surface in a natural state of the ring-shaped metal seal prior to deformation, and
configuring the first flat surface to contact the first convex part and the ridge line of the first projection simultaneously when the first flat surface and the second surface are made to approach each other.

* * * * *